(12) United States Patent
Bracken et al.

(10) Patent No.: US 9,939,344 B2
(45) Date of Patent: Apr. 10, 2018

(54) DETECTING LEAKS IN A FLUID DISTRIBUTION SYSTEM

(71) Applicant: Mueller International, LLC, Atlanta, GA (US)

(72) Inventors: Marc Bracken, Toronto (CA); Shabbir Yusuf, Mississauga (CA)

(73) Assignee: Mueller International, LLC, Atlanta, GA (US)

(*) Notice: Subject to any disclaimer, the term of this patent is extended or adjusted under 35 U.S.C. 154(b) by 797 days.

(21) Appl. No.: 14/063,334

(22) Filed: Oct. 25, 2013

(65) Prior Publication Data
US 2014/0121999 A1 May 1, 2014

Related U.S. Application Data

(60) Provisional application No. 61/719,320, filed on Oct. 26, 2012.

(51) Int. Cl.
*G01F 23/00* (2006.01)
*G01M 3/24* (2006.01)

(52) U.S. Cl.
CPC .................... *G01M 3/243* (2013.01)

(58) Field of Classification Search
CPC ................ G01M 3/24; G01M 3/243
USPC ................................ 702/51, 54
See application file for complete search history.

(56) References Cited

U.S. PATENT DOCUMENTS

| | | | |
|---|---|---|---|
| 3,592,967 A | 7/1971 | Harris | |
| 3,612,922 A | 10/1971 | Furnival | |
| 3,673,856 A | 7/1972 | Panigati | |
| 3,815,129 A | 6/1974 | Sweany | |
| 4,056,970 A | 11/1977 | Sollish | |
| 4,083,229 A | 4/1978 | Anway | |
| 4,156,156 A | 5/1979 | Sweany et al. | |
| 4,333,028 A | 6/1982 | Panton | |
| 4,431,873 A | 2/1984 | Dunn et al. | |
| 4,462,249 A | 7/1984 | Adams | |
| 4,467,236 A | 8/1984 | Kolm et al. | |
| 4,543,817 A | 10/1985 | Sugiyama | |

(Continued)

FOREIGN PATENT DOCUMENTS

| | | |
|---|---|---|
| CA | 2397174 | 8/2008 |
| CA | 2725065 A1 † | 11/2009 |

(Continued)

OTHER PUBLICATIONS

Bracken, Mark; International Preliminary Report on Patentability for serial No. PCT/US2013/066817, filed Oct. 25, 2013, dated Apr. 28, 2015, 8 pgs.

(Continued)

*Primary Examiner* — Eman Alkafawi
(74) *Attorney, Agent, or Firm* — Taylor English Duma LLP

(57) ABSTRACT

Technologies for detecting leaks in a fluid distribution system are described herein. Historical leak detection information is received from a sensor in the fluid distribution system and collected in a database. A baseline is determined from the historical leak information. Current leak detection information is then received from the sensor and the probability of a leak in the fluid distribution system is determined based on a difference between the current leak detection information and the baseline.

20 Claims, 8 Drawing Sheets

(56) References Cited

U.S. PATENT DOCUMENTS

| | | |
|---|---|---|
| 4,930,358 A | 6/1990 | Motegi et al. |
| 4,984,498 A | 1/1991 | Fishman |
| 5,038,614 A | 8/1991 | Bseisu et al. |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A * | 5/1995 | Savic .................. F17D 5/06 702/51 |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,195 A | 1/1998 | Kurisu et al. |
| 5,708,211 A | 1/1998 | Jepson et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,907,100 A | 5/1999 | Cook |
| 5,965,818 A | 10/1999 | Wang |
| 5,970,434 A | 10/1999 | Brophy et al. |
| 5,974,862 A | 11/1999 | Lander et al. |
| 5,987,990 A | 11/1999 | Worthington et al. |
| 6,000,277 A | 12/1999 | Smith |
| 6,000,288 A | 12/1999 | Kwun et al. |
| 6,003,376 A | 12/1999 | Burns et al. |
| 6,023,986 A | 2/2000 | Smith et al. |
| 6,035,717 A | 3/2000 | Carodiskey |
| 6,082,193 A | 4/2000 | Paulson |
| 6,076,407 A | 6/2000 | Levesque et al. |
| 6,125,703 A | 10/2000 | MacLauchlan et al. |
| 6,127,823 A | 10/2000 | Atherton |
| 6,138,512 A | 10/2000 | Roberts et al. |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,363,788 B1 | 4/2002 | Gorman et al. |
| 6,389,881 B1 * | 5/2002 | Yang ................... G01M 3/243 73/40.5 A |
| 6,401,525 B1 | 6/2002 | Jamieson |
| 6,404,343 B1 | 6/2002 | Andou et al. |
| 6,442,999 B1 | 9/2002 | Baumoel |
| 6,453,247 B1 | 9/2002 | Hunaidi |
| 6,470,749 B1 | 10/2002 | Han et al. |
| 6,530,263 B1 | 3/2003 | Chana |
| 6,561,032 B1 | 5/2003 | Hunaidi |
| 6,567,006 B1 | 5/2003 | Lander et al. |
| 6,578,422 B2 | 6/2003 | Lam et al. |
| 6,595,038 B2 | 7/2003 | Williams et al. |
| 6,624,628 B1 | 9/2003 | Kwun et al. |
| 6,647,762 B1 | 11/2003 | Roy |
| 6,651,503 B2 | 11/2003 | Bazarov et al. |
| 6,666,095 B2 | 12/2003 | Thomas et al. |
| 6,667,709 B1 | 12/2003 | Hansen et al. |
| 6,707,762 B1 | 3/2004 | Goodman et al. |
| 6,710,600 B1 | 3/2004 | Kopecki et al. |
| 6,725,705 B1 | 4/2004 | Huebler et al. |
| 6,745,136 B2 | 6/2004 | Lam et al. |
| 6,751,560 B1 | 6/2004 | Tingley et al. |
| 6,772,636 B2 | 8/2004 | Lam et al. |
| 6,772,637 B2 | 8/2004 | Bazarov et al. |
| 6,772,638 B2 | 8/2004 | Matney et al. |
| 6,781,369 B2 | 8/2004 | Paulson et al. |
| 6,782,751 B2 | 8/2004 | Linares et al. |
| 6,789,427 B2 | 9/2004 | Batzinger et al. |
| 6,791,318 B2 | 9/2004 | Paulson et al. |
| 6,799,466 B2 | 10/2004 | Chinn |
| 6,813,949 B2 | 11/2004 | Masaniello et al. |
| 6,813,950 B2 | 11/2004 | Glascock et al. |
| 6,816,072 B2 | 11/2004 | Zoratti |
| 6,820,016 B2 | 11/2004 | Brown et al. |
| 6,822,742 B1 | 11/2004 | Kalayeh et al. |
| 6,843,131 B2 | 1/2005 | Graff et al. |
| 6,848,313 B2 | 1/2005 | Krieg et al. |
| 6,851,319 B2 | 1/2005 | Ziola et al. |
| 6,920,792 B2 | 4/2005 | Flora et al. |
| 6,889,703 B2 | 5/2005 | Bond |
| 6,904,818 B2 | 6/2005 | Harthorn et al. |
| 6,931,931 B2 | 8/2005 | Graff et al. |
| 6,935,178 B2 | 8/2005 | Prause |
| 6,945,113 B2 | 8/2005 | Siverling et al. |
| 6,957,157 B2 | 10/2005 | Lander |
| 6,968,727 B2 | 11/2005 | Kwun et al. |
| 6,978,832 B2 | 12/2005 | Gardner et al. |
| 7,051,577 B2 | 5/2006 | Komninos |
| 7,080,557 B2 | 7/2006 | Adnan |
| 7,111,516 B2 | 9/2006 | Bazarov et al. |
| 7,140,253 B2 | 11/2006 | Merki et al. |
| 7,143,659 B2 | 12/2006 | Stout et al. |
| 7,171,854 B2 | 2/2007 | Nagashima et al. |
| 7,231,331 B2 | 6/2007 | Davis |
| 7,234,355 B2 | 6/2007 | Dewangan et al. |
| 7,240,574 B2 | 7/2007 | Sapelnikov |
| 7,255,007 B2 | 8/2007 | Messer et al. |
| 7,261,002 B1 | 8/2007 | Gysling et al. |
| 7,266,992 B2 | 9/2007 | Shamout et al. |
| 7,284,433 B2 | 10/2007 | Ales et al. |
| 7,293,461 B1 | 11/2007 | Girndt |
| 7,299,697 B2 | 11/2007 | Siddu et al. |
| 7,310,877 B2 | 12/2007 | Cao et al. |
| 7,328,618 B2 | 2/2008 | Hunaidi et al. |
| 7,331,215 B2 | 2/2008 | Bond |
| 7,356,444 B2 | 4/2008 | Blemel |
| 7,360,462 B2 | 4/2008 | Nozaki et al. |

(56) References Cited

U.S. PATENT DOCUMENTS

| | | | |
|---|---|---|---|
| 7,373,808 B2 | 5/2008 | Zanker et al. | |
| 7,380,466 B2 | 6/2008 | Deeg | |
| 7,383,721 B2 | 6/2008 | Parsons et al. | |
| 7,392,709 B2 | 7/2008 | Eckert | |
| 7,405,391 B2 | 7/2008 | Ogisu et al. | |
| 7,412,890 B1 | 8/2008 | Johnson et al. | |
| 7,414,395 B2 | 8/2008 | Gao et al. | |
| 7,418,354 B1 † | 8/2008 | Greenlee | |
| 7,426,879 B2 | 9/2008 | Nozaki et al. | |
| 7,458,267 B2 | 12/2008 | McCoy | |
| 7,475,596 B2 | 1/2009 | Hunaidi et al. | |
| 7,493,817 B2 | 2/2009 | Germata | |
| 7,523,666 B2 | 4/2009 | Thompson et al. | |
| 7,526,944 B2 | 5/2009 | Sabata et al. | |
| 7,530,270 B2 | 5/2009 | Nozaki et al. | |
| 7,543,500 B2 | 6/2009 | Litzenberg et al. | |
| 7,554,345 B2 | 6/2009 | Vokey | |
| 7,564,540 B2 | 7/2009 | Paulson | |
| 7,587,942 B2 | 9/2009 | Smith et al. | |
| 7,590,496 B2 | 9/2009 | Blemel | |
| 7,596,458 B2 | 9/2009 | Lander | |
| 7,607,351 B2 | 10/2009 | Allison et al. | |
| 7,623,427 B2 | 11/2009 | Jann et al. | |
| 7,647,829 B2 | 1/2010 | Junker et al. | |
| 7,650,790 B2 | 1/2010 | Wright | |
| 7,657,403 B2 | 2/2010 | Stripf et al. | |
| 7,668,670 B2 | 2/2010 | Lander | |
| 7,680,625 B2 | 3/2010 | Trowbridge et al. | |
| 7,690,258 B2 | 4/2010 | Minagi et al. | |
| 7,694,564 B2 | 4/2010 | Brignac et al. | |
| 7,711,217 B2 | 5/2010 | Takahashi et al. | |
| 7,751,989 B2 | 7/2010 | Owens et al. | |
| 7,810,378 B2 | 10/2010 | Hunaidi et al. | |
| 7,980,317 B1 | 7/2011 | Preta et al. | |
| 8,319,508 B2 | 11/2012 | Vokey | |
| 8,620,602 B2 † | 12/2013 | Alonso | |
| 8,674,830 B2 | 3/2014 | Lanham et al. | |
| 8,843,241 B2 † | 9/2014 | Saberi | |
| 9,291,520 B2 | 3/2016 | Fleury, Jr. et al. | |
| 2001/0045129 A1 | 11/2001 | Williams et al. | |
| 2002/0043549 A1 | 4/2002 | Taylor et al. | |
| 2002/0159584 A1 | 10/2002 | Sindalovsky et al. | |
| 2003/0107485 A1 | 6/2003 | Zoratti | |
| 2003/0167847 A1 | 9/2003 | Brown et al. | |
| 2004/0264416 A1* | 12/2004 | Robinson | H04L 1/08 370/335 |
| 2005/0005680 A1 | 1/2005 | Anderson | |
| 2005/0279169 A1 | 12/2005 | Lander | |
| 2006/0174707 A1 | 8/2006 | Zhang | |
| 2006/0283251 A1 | 12/2006 | Hunaidi | |
| 2007/0051187 A1 | 3/2007 | McDearmon | |
| 2007/0113618 A1 | 5/2007 | Yokoi et al. | |
| 2007/0130317 A1 | 6/2007 | Lander | |
| 2008/0078567 A1 | 4/2008 | Miller et al. | |
| 2008/0300803 A1* | 12/2008 | Drake | G01M 3/2815 702/51 |
| 2008/0307623 A1 | 12/2008 | Furukawa | |
| 2009/0058088 A1 | 3/2009 | Pitchford et al. | |
| 2009/0182099 A1 | 7/2009 | Noro et al. | |
| 2009/0214941 A1 | 8/2009 | Buck et al. | |
| 2009/0216353 A1 | 8/2009 | Van Reck | |
| 2009/0278293 A1 | 11/2009 | Yoshinaka et al. | |
| 2010/0089127 A1* | 4/2010 | Farnsworth | G01M 3/26 73/40.5 R |
| 2010/0156632 A1 | 6/2010 | Hyland et al. | |
| 2010/0290201 A1 | 11/2010 | Takeuchi et al. | |
| 2010/0295672 A1 | 11/2010 | Hyland et al. | |
| 2010/0312502 A1 † | 12/2010 | Alonso | |
| 2010/0313849 A1* | 12/2010 | Stoner | F02D 41/22 123/350 |
| 2011/0066297 A1 † | 3/2011 | Saberi | |
| 2011/0308638 A1 | 12/2011 | Hyland et al. | |
| 2012/0007743 A1 | 1/2012 | Solomon | |
| 2012/0007744 A1 | 1/2012 | Pal et al. | |
| 2012/0079872 A1* | 4/2012 | Schaefer | G01M 3/2807 73/40.5 A |
| 2012/0272722 A1* | 11/2012 | Khalifa | G01M 3/2823 73/40.5 R |
| 2013/0030577 A1* | 1/2013 | Jarrell | F17D 5/00 700/282 |
| 2015/0247777 A1 | 9/2015 | Kondou | |

FOREIGN PATENT DOCUMENTS

| | | |
|---|---|---|
| CA | 2634739 | 6/2015 |
| DE | 4211038 | 10/1993 |
| EP | 1052492 | 11/2000 |
| EP | 1077370 | 2/2001 |
| EP | 1077371 | 2/2001 |
| FR | 2439990 | 5/1980 |
| FR | 2776065 | 9/1999 |
| GB | 2250820 | 6/1992 |
| GB | 2269900 | 2/1994 |
| GB | 2367362 | 4/2002 |
| GB | 2421311 | 6/2006 |
| JP | 59170739 | 9/1984 |
| JP | 60111132 | 6/1985 |
| JP | S61223628 | 10/1986 |
| JP | 08250777 | 9/1996 |
| JP | 2002206965 | 7/2002 |
| SG | 11201503041 S | 9/2016 |
| WO | 9850771 | 11/1998 |
| WO | 0151904 | 7/2001 |
| WO | 2007069150 | 6/2007 |
| WO | 2009067770 | 9/2008 |
| WO | 2009067770 A1 † | 6/2009 |
| WO | 2009143287 | 11/2009 |
| WO | 2009143287 A1 † | 11/2009 |
| WO | 2011021039 | 2/2011 |
| WO | 2011058561 | 5/2011 |
| WO | 2012000088 | 1/2012 |
| WO | 2012153147 | 11/2012 |
| WO | 2013025526 | 2/2013 |
| WO | 2014066764 | 5/2014 |

OTHER PUBLICATIONS

Fleury Jr., Leo W.; Non-Final Office Action for U.S. Appl. No. 13/492,790, filed Jun. 8, 2012, dated Nov. 5, 2014, 30 pgs.

Fleury, Jr., Leo W.; Advisory Action for U.S. Appl. No. 13/492,790, filed Jun. 8, 2012, dated Jul. 9, 2014, 3 pgs.

Fleury, Jr., Leo W.; Final Office Action for U.S. Appl. No. 13/492,790, filed Jun. 8, 2012, dated Mar. 12, 2014; 19 pgs.

Fleury, Jr., Leo W.; Non-Final Office Action for U.S. Appl. No. 13/492,790, filed Jun. 8, 2012, dated Sep. 12, 2013; 37 pgs.

Fleury, Jr., Leo W.; Notice of Allowance for U.S. Appl. No. 13/492,790, filed Jun. 8, 2012, dated May 12, 2015, 9 pgs.

Fleury, Jr., Leo W.; U.S. Patent Application Entitled: Fire Hydrant Leak Detector under U.S. Appl. No. 13/492,790, filed Jun. 8, 2012, 69 pgs.

Fleury, Jr., Leo W.; U.S. Patent Application Entitled: Leak Detector and Sensor under U.S. Appl. No. 13/492,792, filed Jun. 8, 2012, 68 pgs.

Richarz, Werner Guenther; Final Office Action for U.S. Appl. No. 13/492,792, filed Jun. 8, 2012, dated Oct. 20, 2014, 17 pgs.

Richarz, Werner Guenther; Non-Final Office Action for U.S. Appl. No. 13/492,792, filed Jun. 8, 2012, dated Nov. 6, 2013, 39 pgs.

Richarz, Werner Guenther; Non-Final Office Action for U.S. Appl. No. 13/492,792, filed Jun. 8, 2012, dated Jun. 4, 2014, 24 pgs.

Richarz, Werner Guenther; Non-Final Office Action for U.S. Appl. No. 13/492,792, filed Jun. 8, 2012, dated Feb. 27, 2015, 15 pgs.

Richarz, Werner Guenther; Restriction Requirement for U.S. Appl. No. 13/492,792, filed Jun. 8, 2012, dated Sep. 27, 2013; 5 pgs.

Dintakurti, Ganapathi Deva Varma; Non-Final Office Action for U.S. Appl. No. 13/492,794, filed Jun. 8, 2012, dated Jan. 16, 2015, 60 pgs.

Fleury, Jr., Leo W.; U.S. Patent Application Entitled: Leak Detector under U.S. Appl. No. 13/492,794, filed Jun. 8, 2012, 69 pgs.

(56) References Cited

OTHER PUBLICATIONS

Fleury Jr, Leo W.; Non-Final Office Action for U.S. Appl. No. 13/492,795, filed Jun. 8, 2012, dated Sep. 23, 2013; 35 pgs.
Fleury, Jr., Leo W.; Advisory Action for U.S. Appl. No. 13/492,795, filed Jun. 8, 2012, dated Jun. 18, 2014, 4 pgs.
Fleury, Jr., Leo W.; Final Office Action for U.S. Appl. No. 13/492,795, filed Jun. 8, 2012, dated Apr. 23, 2014, 19 pgs.
Fleury, Jr., Leo W.; Non-Final Office Action for U.S. Appl. No. 13/492,795, filed Jun. 8, 2012, dated Oct. 21, 2014, 37 pgs.
Fleury, Jr., Leo W.; U.S. Patent Application Entitled: Enclosure for Leak Detector under U.S. Appl. No. 13/492,795, filed Jun. 8, 2012, 68 pgs.
Fleury, Leo W.; International Preliminary Report on Patentability for serial No. PCT/US12/50390 filed Aug. 10, 2012, dated Feb. 18, 2014, 14 pgs.
Fleury, Leo W.; International Search Report and Written Opinion for serial No. PCT/US12/50390 filed Aug. 10, 2012, dated Dec. 17, 2012, 18 pgs.
Fleury, Jr., Leo W.; PCT Application Entitled: Fire Hydrant Leak Detector under serial No. PCT/US12/50390, filed Aug. 10, 2012, 80 pgs.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Zusman, George V.; U.S. Patent Application entitled: Piezoelectric Vibration Sensor for Fluid Leak Detection, having U.S. Appl. No. 14/503,951, filed Oct. 1, 2014, 32 pgs.
Fleury, et al.; Supplemental European Search Report for application No. 12823594.2, filed Aug. 20, 2012, dated Feb. 18, 2015, 6 pgs.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Non-Patent Literature "Radiodetection Water Leak Detection Products", 2008, Radiodetection Ltd.—SPX Corporation.
Fleury, Jr., Leo W.; Final Office Action for U.S. Appl. No. 13/492,795, filed Jun. 8, 2012, dated May 22, 2015, 28 pgs.
Fleury Jr., Leo W.; European Search Report for serial No. 12823594, filed Aug. 10, 2012, dated Jun. 8, 2015, 11 pgs.
Richarz, Werner Guenther; Final Office Action for U.S. Appl. No. 13/492,792, filed Jun. 8, 2012, dated Sep. 10, 2015, 20 pgs.
Fleury, Jr., Leo W.; Advisory Action for U.S. Appl. No. 13/492,795, filed Jun. 8, 2012, dated Sep. 9, 2015, 3 pgs.
Hunaidi, Osama; Issue Notification for U.S. Appl. No. 11/766,288, filed Jun. 21, 2007, dated Sep. 22, 2010, 1 pg.
Hunaidi, Osama; Non-Final Office Action for U.S. Appl. No. 11/766,288, filed Jun. 21, 2007, dated Jan. 20, 2010, 50 pgs.
Hunaidi, Osama; Notice of Allowance for U.S. Appl. No. 11/766,288, filed Jun. 21, 2007, dated Jun. 24, 2010, 8 pgs.
Hunaidi, Osama; U.S. Patent Application entitled: Monitoring of Leakage in Wastewater Force Mains and Other Pipes Carrying Fluid under Pressure, having U.S. Appl. No. 11/766,288, filed Jun. 21, 2007, 33 pgs.
Bracken, Mark; International Search Report and Written Opinion for serial No. PCT/US2013/066817, filed Oct. 25, 2013, dated Mar. 18, 2014, 9 pgs.
Fleury, Jr., Leo W.; Issue Notification for U.S. Appl. No. 13/492,790, filed Jun. 8, 2012, dated Mar. 2, 2016, 1 pg.
Fleury, Jr., Leo W.; Notice of Allowance for U.S. Appl. No. 13/492,790, filed Jun. 8, 2012, dated Feb. 2, 2016, 9 pgs.
Richarz, Werner Guenther; Non-Final Office Action for U.S. Appl. No. 13/492,792, filed Jun. 8, 2012, dated Mar. 8, 2016, 27 pgs.
Fleury, Jr., Leo W.; Non-Final Office Action for U.S. Appl. No. 13/492,795, filed Jun. 8, 2012, dated Mar. 1, 2016, 42 pgs.
Bracken, Marc; Written Opinion for Singapore application No. 11201503041s, filed Oct. 25, 2013, dated Jan. 5, 2016, 7 pgs.
Non-Patent Literature Bimorph (entitled "Bimoprh actuators"), accessed at http://web.archive.org/web/20080122050424/http://www.elpapiezo.ru/eng/curve_e.shtml, archived on Jan. 22, 2008.
Non-Patent Literature Murata (entitled "Piezoelectric Sounds Components"), accessed at http://web.archive.org/web/20030806141815/http://www.murata.com/catalog/p37e17.pdf, archived on Aug. 6, 2003.
Non-Patent Literature NerdKits, accessed at http://web.archive.org/web/20090510051850/http://www.nerdkits.com/videos/sound_meter/, archived on May 10, 2009.
Bracken, Marc; Partial Supplementary European Search Report for European application No. 13849336.6, filed Oct. 15, 2013, dated Mar. 11, 2016, 7 pgs.
Zusman, George V.; Extended European Search Report for serial No. 15188004.4, filed Oct. 1, 2015, dated Feb. 22, 2016, 9 pgs.
Bracken, Marc; U.S. Provisional Application entitled: Detecting Leaks in Water Pipes, having serial U.S. Appl. No. 61/719,320, filed Oct. 26, 2012, 33 pgs.
Bracken, Mark; PCT Application entitled: Detecting Leaks in a Fluid Distribution System, having serial No. PCT/US13/66817, filed Oct. 25, 2013, 33 pgs.
Fleury, Jr., Leo W.; Notice of Allowance for U.S. Appl. No. 13/492,790, filed Jun. 8, 2012, dated Sep. 23, 2015, 11 pgs.
Fleury, Leo W.; U.S. Continuation Application entitled: Leak Detector having serial No. 14/870,070, filed Sep. 30, 2015, 80 pgs.
Bracken, Marc; Examination Report for Singapore application No. 11201503041s, filed Oct. 25, 2013, dated Mar. 16, 2016, 4 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Non-Final Office Action for U.S. Appl. No. 13/492,794, filed Jun. 8, 2012, dated May 17, 2016, 48 pgs.
Zusman, George, V.; Applicant Initiated Interview Summary for U.S. Appl. No. 14/503,951, filed Oct. 1, 2014, dated Jul. 12, 2016, 3 pgs.
Zusman, George, V.; Non-Final Office Action for U.S. Appl. No. 14/503,951, filed Oct. 1, 2014, dated Mar. 13, 2016, 77 pgs.
Bracken, Marc; European Search Report for European application No. 13849336.6, filed Oct. 15, 2013, dated Jul. 11, 2016, 13 pgs.
Bracken, Marc; Australian First Examination Report for Australian Application No. 2013334158, filed Oct. 25, 2013, dated Nov. 29, 2016, 4 pgs.
Bracken, Marc; Examination Report for European Application No. 13849336.6, filed Oct. 15, 2013, dated May 24, 2017, 5 pgs.
Bracken, Marc; Second Examination Report for Australian Application No. 2013334158, filed Oct. 25, 2013, dated Jul. 11, 2017, 4 pgs.
Bracken, Marc; Notification of material filed by a third part for Australian Application No. 2013334158, filed Oct. 25, 2013, dated Oct. 24, 2017, 38 pgs.
Bracken, Marc; Third Examination Report for Australian Application No. 2013334158, filed Oct. 25, 2013, dated Oct. 25, 2017, 5 pgs.
Harris, Fredric J; Article entitled: "On the Use of Windows for Harmonic Analysis with the Discrete Fourier Transform"; in Proceedings of the IEEE vol. 66, No. 1, Jan. 1978, 33 pgs.
Hewlett Packard; Article entitled: The Fundamentals of Signal Analysis, Application Note 243, 1994, 68 pgs.
Horowitz, et al.; The Art of Electronics, 2nd Edition, Cambridge University Press, 1989, 26 pgs.
National Instruments; Article entitled: The Fundamentals of FFT-Based Signal Analysis and Measurement in LabVIEW and LabWindows/CVI, located at <http://www.ni.com/white-paper/4278/en/>, 18 pgs.
Nuttall, Albert H; Article entitled: "Some Windows with Very Good Sidelobe Behavior"; IEEE Transactions on Acoustics, Speech, and Signal Processing vol. 29, No. 1, Feb. 1981, 8 pgs.
Randall, et al.; Article entitled: "Frequency Analysis", 3rd Edition, Bruël and Kjær, Sep. 1979, 344 pgs.

* cited by examiner
† cited by third party

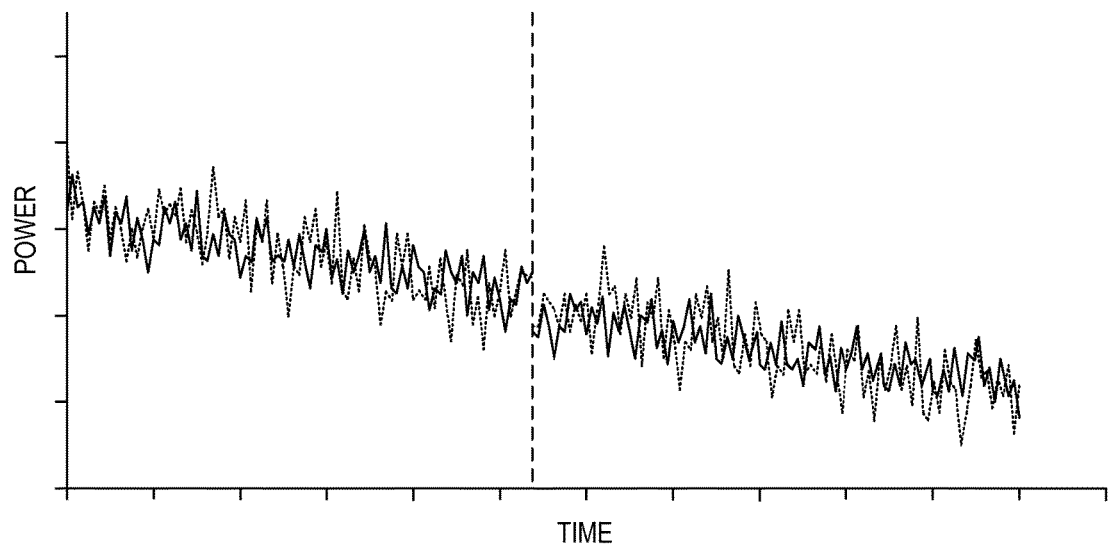
FIG. 9C
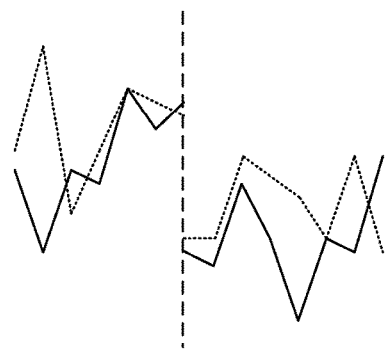 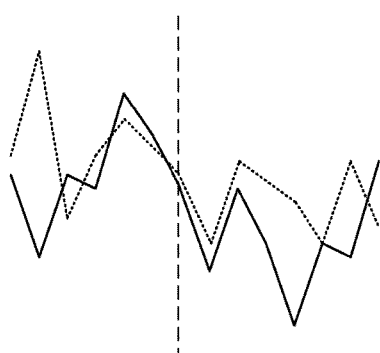
FIG. 9D  FIG. 9E

DETECTING LEAKS IN A FLUID DISTRIBUTION SYSTEM

CROSS-REFERENCE TO RELATED APPLICATIONS

This patent application claims the benefit of U.S. Provisional Application No. 61/719,320 entitled "Detecting Leaks in Water Pipes," which was filed on Oct. 26, 2012, and which is expressly incorporated herein by this reference in its entirety.

TECHNICAL FIELD

The present disclosure generally relates to fluid distribution systems, and more particularly relates to detecting leaks in pipes used in all portions of fluid distribution systems, including water distribution systems, made from all varieties of materials—PVC, cast iron, AC, etc.

BACKGROUND

Water utility companies source water, pump water to storage facilities, and distribute water to customers through a network of water pipes. The size of pipes may vary depending on the volume of water that is designed to flow through a particular section of pipe. For example, large water mains may provide water distribution in areas close to the source of the water or carry water from a source to an area where it is distributed, and the size of pipes may decrease as the distance from the source increases. One concern for water utility companies is the loss of water through leaks in the pipes. Not only do leaks waste clean potable water, but sometimes contaminants may be introduced into the water supply from outside the pipes.

Due to the rapidly escalating costs of potable water, the scarcity of fresh water supplies, the increasing costs for water treatment and distribution, and the potential for costly damage to subsurface infrastructure, minimizing leaks in water distribution systems is a goal of both public and private water distribution utilities. If a leak is not particularly conspicuous, it may go undetected for months at a time without repair. It is therefore important to be able to detect leaks early. One technique for detecting leaks is to measure pressure. However, a leak in a piping system may not necessarily produce a head pressure that appears as a change from normal pressures. In addition to allowing leaks to go undetected, another issue with existing leak detection systems is the high rate of false alarms. A false alarm, for instance, may cause extraneous and costly maintenance activity or it may diminish the effectiveness of the detection system since operators may start to ignore leak warnings. There is therefore a need for a leak detection system that accurately detects leaks in a network of water pipes.

SUMMARY

Technologies for detecting leaks in a fluid distribution system are described herein. According to some embodiments, a method for detecting leaks in the fluid distribution system comprises receiving at historical leak detection information from a sensor in the fluid distribution system and collecting the historical leak detection information in a database. A processor then determines a baseline from the historical leak information. The processor may then receive current leak detection information from the sensor and determine a probability of a leak in the fluid distribution system based on a difference between the current leak detection information and the baseline.

In further embodiments, a system for detecting a leak in a fluid distribution system includes a plurality of leak detectors in the fluid distribution system and a host. Each leak detector may comprise one or more sensors, a processing device, and a first communication device. The processing device may be configured to receive signal data from the one or more sensors, process the signal data, and send the processed signal data via the communication device to the host. The host may comprise a processor, a database, and a communication module, with the processor configured to receive via the communication module the processed signal data from the plurality of leak detectors, store the processed signal data in the database, determine a baseline from the stored signal data for each of the plurality of leak detectors, receive later signal data from one of the plurality of leak detectors that is different from the baseline determined for that leak detector, and determine that a leak has occurred in the fluid distribution system based on the difference between the later signal data and the baseline determined for that leak detector.

In further embodiments, an apparatus comprises one or more sensors, a communication device, and a processing device operatively coupled to the one or more sensors and the communication device. The processing device may be further configured to receive an acoustic waveform from the one or more sensors and compare the acoustic waveform to a predetermined threshold to determine if the predetermined threshold has been exceeded. If the predetermined threshold has been exceeded, the processing device may remove a section of the acoustic waveform that exceeds the threshold and rejoin the waveform, and, upon rejoining the acoustic waveform, transmit data regarding the acoustic waveform to a host via the communication device. The host may be configured to detect a leak in a water distribution system based on the data regarding the acoustic waveform.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 9A-9E are graphs illustrating examples of signals detected by the sensor assembly shown in FIG. 7 and the processing of the signals.

DETAILED DESCRIPTION

The present disclosure describes systems and methods for detecting leaks in a water distribution system. In the present disclosure, a distinction may be made between different sizes of water mains, for example, those having a larger diameter and those having a smaller diameter. Using acoustic data and pressure data that is sensed by various types of sensors in contact with the water mains, leaks can be detected. The leak detection information can be communicated to the utility provider for further analysis. Depending on the type of leak, maintenance personnel may be deployed to repair or replace leaky pipes in the water distribution system.

Minimizing leaks in the water distribution system is recognized as a critical success factor for water distribution utilities, especially due to the scarcity of fresh water supplies, the cost of water treatment, and the costs for water distribution. The present disclosure provides an autonomous leak detection system that overcomes the limited effectiveness of existing leak detection systems with attendant high false alarm rates (dry hole), undetected leaks, poor performance on small and/or quiet leaks, poor performance on pipes of differing materials, and high false positives. The water leak detecting systems and methods disclosed herein provide continuous leak detection so that water utilities may be automatically alerted to pipe breaks in their system, allowing them to rapidly dispatch repair crews to minimize customer service disruption and simultaneously minimize subsurface damage, water loss, and infrastructure damage.

The leak detecting systems of the present disclosure are compatible with all distribution pipe types, including plastic pipes and those with plastic repair sleeves. Also, the present systems have a high accuracy rate as measured by the percentage of leaks identified and a minimal percentage of false alarms. Another advantage of the present systems is the ability to provide continuous monitoring for burst pipes or large leaks, which may require immediate attention.

Figure 1:
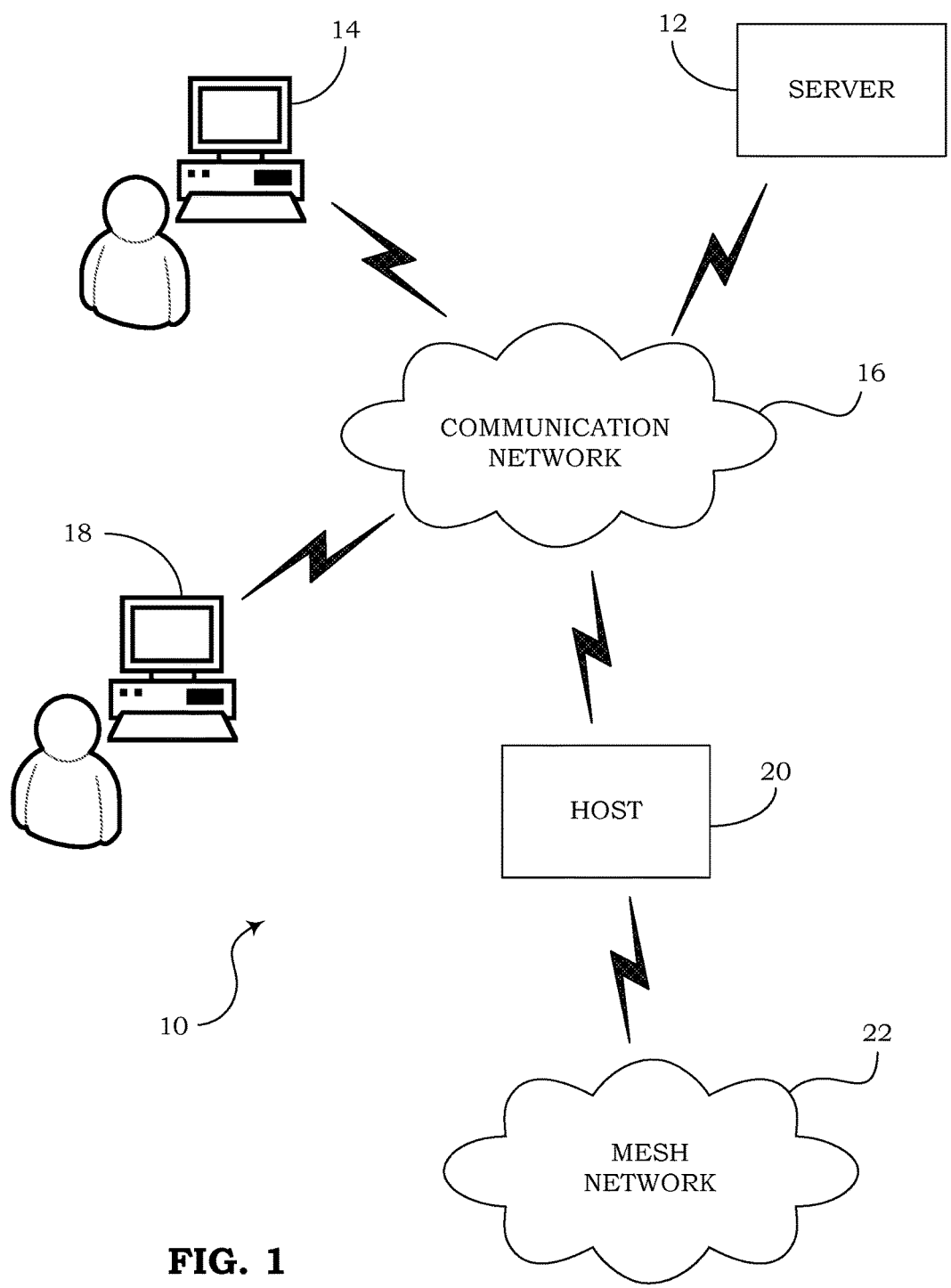
FIG. 1 is a block diagram illustrating a leak detection system according to various implementations of the present disclosure.

FIG. 1 is a block diagram illustrating an embodiment of a leak detection system 10. The leak detection system 10 comprises at least a server 12, an operator system 14, a communication network 16, a client system 18, a host 20, and a mesh network 22. The host 20 is configured to communicate with a plurality of "nodes" of the mesh network 22. The nodes may include leak detectors, and in some embodiments may also include customer meter devices, relay devices, system status detecting devices, devices for measuring various system parameters such as pressure, water quality, etc., and other communication devices. The nodes are configured for communicating leak detection information and/or utility information from the nodes, leak detection system or meter to the host 20.

According to various implementations of the present disclosure, the host 20 may be configured to receive information from leak detectors, which are connected within the mesh network, pertaining to the status of various water pipes in a water distribution system of a water utility company. The leak detectors may be configured to provide information related to various measurements, such as acoustic, pressure, or vibration measurements. This information may be stored by the host 20 for historic purposes for determining a baseline waveform indicative of a properly operating water distribution system. When later signals are received that indicate excessive acoustic or vibration activity, the host 20 may be configured to determine that a leak has been detected. Optionally, the host 20 may confirm the leak by performing a correlation of samples of acoustical data from two or more different nodes.

Also shown in FIG. 1 is a server 12 that may be configured to provide much of the leak detection analysis to assist the host 20. The server 12 may be located on the utility company (e.g., water utility company) premises or located remotely and may provide communication with other users via the communication network 16. In some embodiments, the server 12 may be part of a company responsible for managing the utility measurement data or for providing monitoring services for communicating issues (e.g., leaky pipes) in the utility infrastructure to the various utility companies. The communication network 16 in these embodiments may be a local area network (LAN), wide area network (WAN), such as the Internet, or any other suitable data communication networks or combination thereof. The communication network 16 may also include other types of networks, such as plain old telephone service (POTS), cellular systems, satellite systems, etc.

The operator system 14 shown in FIG. 1 may represent a computer system that is operated by personnel of a company managing the leak detection systems and utility measurement devices within the mesh network 22. In some respects, the operator system 14 may include an administrator for the leak detection system 10. Optionally, the operator system 14 may include an interface for notification that is also an interface to a short message service (SMS) network. In some circumstances, as described in more detail below, the user of the operator system 14 may be provided with information indicating that an event has occurred that requires immediate response. For example, if a large leak, or burst event, has occurred in one of the water mains, resulting in a large amount of water escaping from the mains, the user of the operator system 14 may need to deploy maintenance or repair personnel to resolve the burst issue. The server 12 and/or host 20 may detect extreme events, such as a burst in a pipe, and provide an alarm to the operator system 14. The alarm may be in the form of an automated e-mail, a pop-up window, text or SMS message, an interrupt signal or indication on a computer or other communication device of the operator system 14, or other suitable message signifying an urgent event.

The client system 18 may include a computer system used by the utility provider. In this respect, the utility provider system 18 may be a client of the administration company that manages the utility measurement data and/or provides monitoring services regarding the status of the utility infrastructure. The client system 18, therefore, may be enabled to receive and review status updates regarding the infrastructure. Alarms may be provided to the client system 18, which may then be acknowledged and confirmed. The client system 18 may also receive historic data and manage the customer's accounts and usage information. In some embodiments, information may be provided to the client system 18 in a read-only manner.

Figure 2:
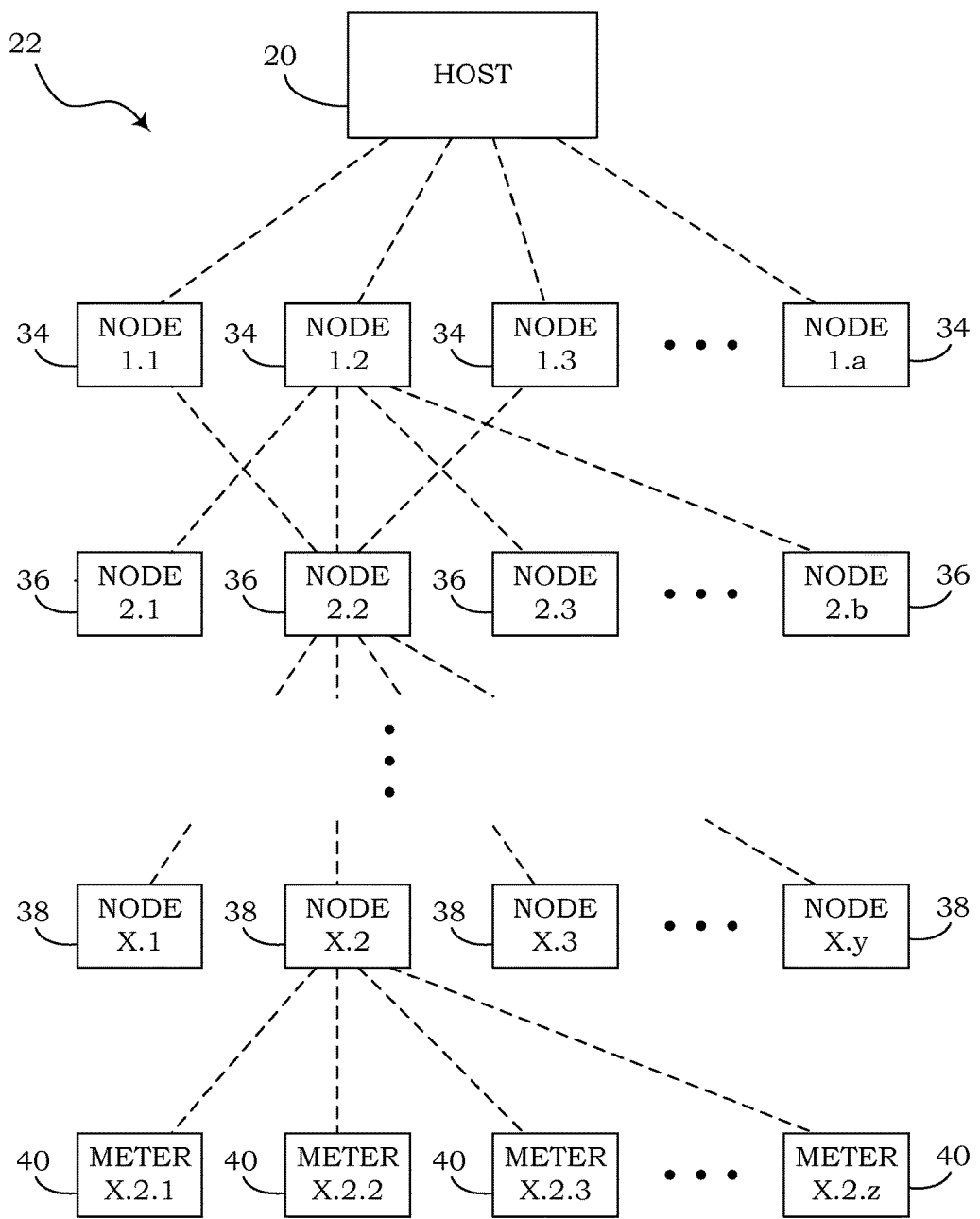
FIG. 2 is a block diagram illustrating a mesh network according to various implementations of the present disclosure.

FIG. 2 is a block diagram showing an embodiment of the mesh network 22 of FIG. 1, shown in a hierarchical configuration. Although the mesh network 22 may typically be distributed throughout a geographical region, the block diagram of FIG. 2 shows a hierarchy to emphasize the parent/child relationships among the various components.

As illustrated, the mesh network 22 includes the host 20, a first level of intermediate nodes 34, a second level of intermediate nodes 36, a lowest level of intermediate nodes 38, and meters 40. Nodes may be identical at all levels, and intermediate nodes may be associated with meters or leak detectors or may simply be network repeaters. In some embodiments, the intermediate nodes may include leak detectors for detecting leaks, where communication with the host 20 may include forwarding information up the hierarchy via other intermediate nodes. The intermediate nodes may be configured as stand-alone devices for assisting in the transfer of data between the host 20 and leak detectors (or meters 40). The mesh network 22 may include any number of levels X of intermediate nodes between the host 20 and the meters 40.

The host 20, intermediate nodes 34, 36, 38, and meters 40, according to various implementations, may comprise circuitry and functionality to enable radio frequency (RF) communication among the various components. The dashed lines shown in FIG. 2 may therefore represent RF communication channels between the different components. In other embodiments, the devices may communicate with the host 20 by a cellular service, via cellular towers and/or satellites. The wireless communication between the host 20 and nodes/devices 34, 36, 38, and 40 may be active during some periods of time (when two respective devices are linked) and may be inactive during other periods of time (when the devices are not linked and/or are in sleep mode). Alternatively, any of the nodes may be connected together through wired connections.

Figure 3:
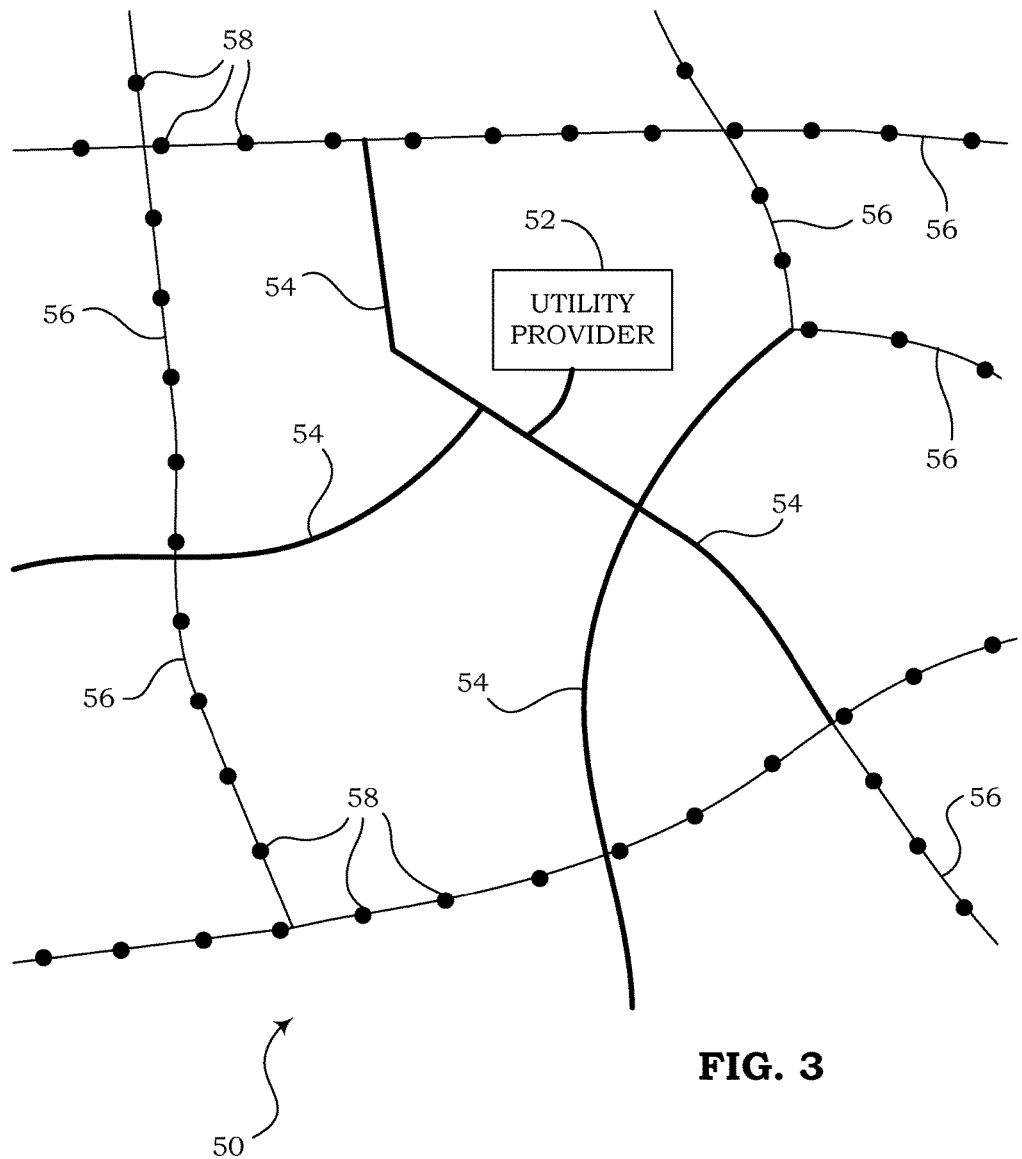
FIG. 3 is a diagram illustrating an example of a water distribution system.

FIG. 3 is a diagram illustrating an example of a portion of a fluid distribution system, such as a water distribution system 50. It should be understood that the portion of the water distribution system 50 is shown merely as an example and does not necessarily depict a specific water utility. Furthermore, it should be understood that the portion of the water distribution system 50 only illustrates the distribution portion, while the present disclosure may relate also to source, treatment, storage, and distribution systems of a utility. Many different configurations of fluid distribution systems are possible and may be based on factors such as geography, usage requirements, population, etc. The water distribution system 50 in this example includes a utility provider 52, such as a water utility company, and various water mains. The water mains include transmission mains 54 (shown by thicker lines), which may include water pipes having an inside diameter of at least twelve inches for example. The water mains also include distribution mains 56, which may include smaller pipes having an inside diameter of less than twelve inches for example. The transmission mains 54, having a greater size, may be configured to allow a greater amount of water flow in comparison with the distribution mains 56. The transmission mains 54 may be located nearer to the utility water source (e.g., utility provider 52) and the distribution mains 56 may be located farther from the utility provider 52. In some systems, distribution mains 56 may be located along secondary roads or residential roads. The water distribution system 50 also includes a number of fire hydrants 58 (shown as dots), which are spaced along the distribution mains 56. Although not shown, the fire hydrants 58 may also be tapped into the larger transmission mains 54. In some embodiments, the fire hydrants 58 may be spaced up to a distance of about 1,500 feet from each other.

Figure 4:
FIG. 4 is a diagram illustrating an example of leak in a main of a water distribution system.

According to various embodiments of the present disclosure, leak detection devices may be attached to the fire hydrants 58. In some embodiments, leak detection devices may be attached to each hydrant 58 while other embodiments may include attachment with about every other one of the hydrants 58. In FIG. 4, two adjacent fire hydrants 58 are shown, connected to the mains 54/56 for detecting a leak, such as leak 60. Because of the nature of a water leak, such as leak 60, acoustic signals or vibration signals can be detected on the components (e.g., mains 54 or 56, fire hydrants 58, etc.) of the water distribution system 50. Particularly, leak detectors may be mounted on the mains 54/56 themselves or may be mounted on the hydrants 58. Optionally, when two leak detectors, adjacent on the water distribution system such as sensors mounted on hydrants 58 nearest to the leak 60, are able to pick up acoustic signals with sufficient strength, the signals may be used to detect the presence and location of a leak. Alternatively, a leak detector may be located in a meter, in another communication device, as a stand-alone unit, or in any other piece of utility equipment that interfaces with the water distribution system 50.

Figure 5:
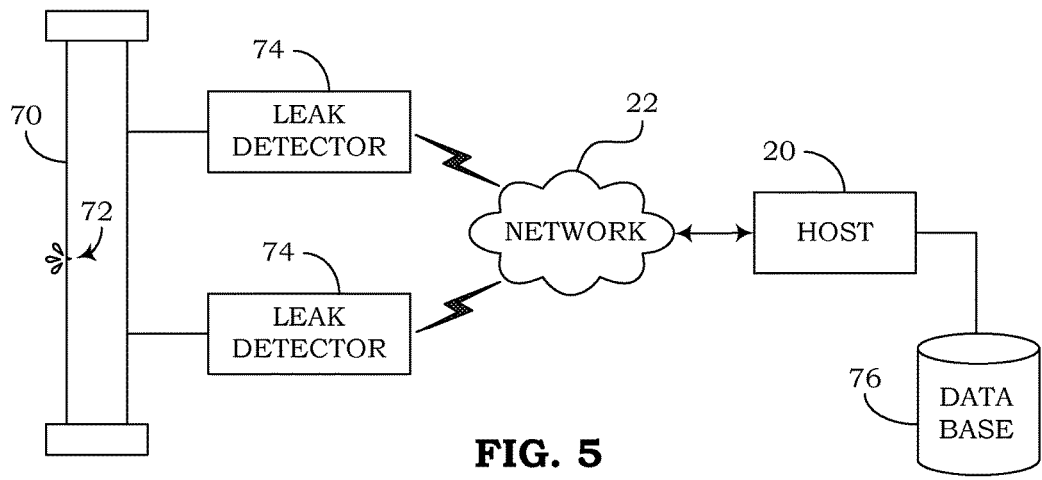
FIG. 5 is a block diagram illustrating a leak detection system according to various implementations of the present disclosure.

FIG. 5 is a block diagram illustrating an embodiment of a portion of a leak detection system according to various implementations. As illustrated, the leak detection system of FIG. 5 includes a section of pipe 70, which has a leak 72. The system also includes leak detectors 74, which are positioned strategically in the water distribution system 50. Although the leak detectors 74 are shown as being attached to or in contact with the section of pipe 70, it should be understood that the leaks detectors 74 may also be connected to an inside surface of the pipe 70 and in contact with the water flowing in the pipe. In other embodiments, the leak detectors 74 may be connected to an outside surface of the pipe 70, on an inside or outside portion of a fire hydrant 58 attached to pipe 70, attached to operating nut on a valve, or attached to another portion of a water distribution system. The leak detectors 74 communicate sensed signals (e.g., acoustic signals, pressure signals, etc.) to the host 20 via the mesh network 22. In one embodiment, the leak detectors 74 communicate the sensed signals periodically or upon detection. In another embodiment, the leak detectors 74 may communicate the sensed signals in response from a request from a host. For example, the network 22 may include relay devices (e.g., using Industrial, Scientific, and Medical (ISM) frequency transmission under Part 15 of the FCC Regulations within the range of 908-928 MHz) for relaying radio signals from the leak detectors 74 to the host 20. The network 22 in some embodiments may also include a cellular network, a radio network, a LAN, a WAN, or any other suitable network, or any combination thereof. The host 20 may be configured to store signals from the leak detectors 74 in a database 76. In one embodiment, the host 20 may request that leak detectors 74 provide data relating to the sensed signals at specific times or on demand via the network 22. In another embodiment, the leak detectors 74 may be configured to send data relating to the sensed signals at specific times or in response to detecting data indicative of a leak condition.

In one embodiment, the leak detectors 74 may be configured to send acoustic data to the host 20 on a periodic basis. For example, the leak detectors 74 may be configured to provide the acoustic information collected over a two-hour period every day at a certain time. The leak detectors 74 may also be configured to communicate urgent events, such as an indication of a large leak or burst. Alarms may be communicated to the host 20 when a burst is detected. Therefore, the leak detectors 74 may be configured to detect both small leaks and large leaks. During the periodic acoustic measurement times, any indication of a leak may be seen as an inconsistency with historic data. However, any large amount of acoustic activity detected at any time may give rise to an alarm signal for indicating a burst. Since small leaks do not necessarily require immediate attention, the reporting of the small leaks can be delayed until a designated reporting time. However, a detected burst usually requires a quick response in order that the burst can be attended to rapidly.

Figure 6:
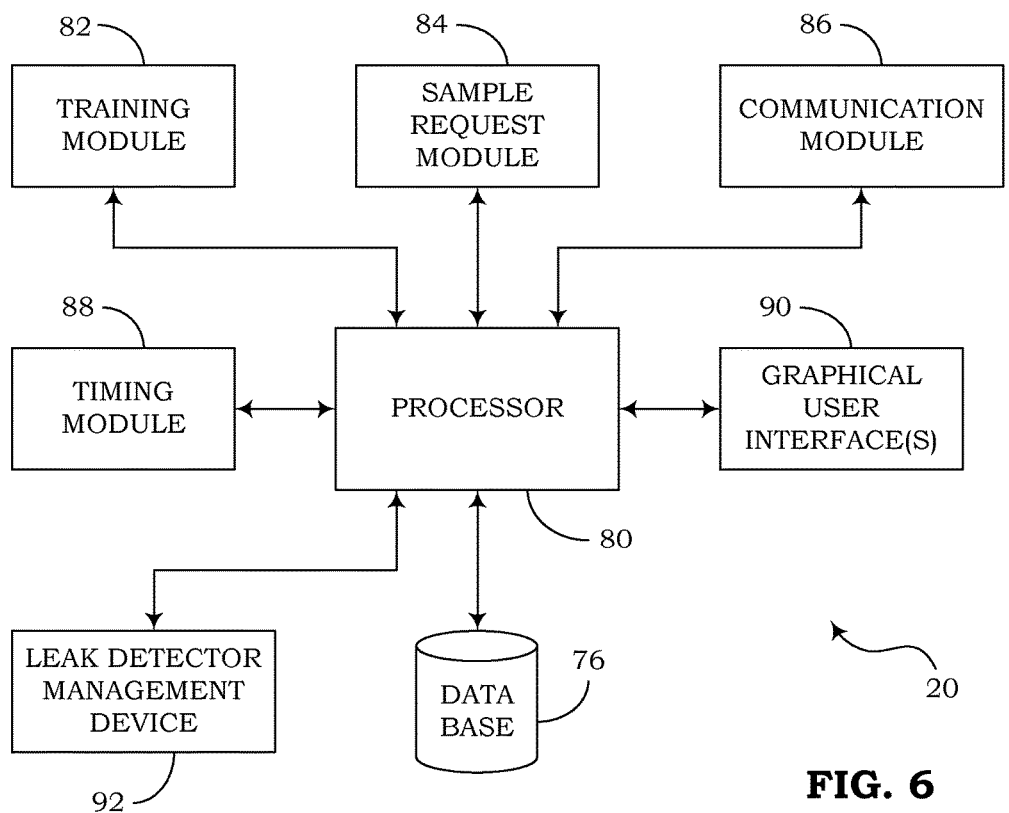
FIG. 6 is a block diagram illustrating the host shown in FIG. 1 according to various implementations.

FIG. 6 is a block diagram illustrating an embodiment of the host 20, shown for example in FIGS. 1, 2, and 5. In this embodiment, the host 20 comprises a processor 80 configured to manage the data and signal processing functions of the host 20. The host 20 also includes a training module 82, a sample request module 84, a communication module 86, a timing module 88, graphical user interface(s) 90 (or GUIs), a leak detector management device 92, and the database 76 shown also in FIG. 5. The host 20 may include any combination of software, hardware, and/or firmware. For example, a portion of the training module 82, sample request module 84, communication module 86, timing module 88, GUIs 90, and leak detector management device 92 may be configured entirely or partially in software and stored in a suitable memory device (not shown).

The training module 82 may be configured to conduct a training session during a period of time when the leak detectors are first installed and ready to be initialized. The leak detectors may "listen" for acoustic signals for a 24-hour period to determine the quietest 2-hour window during the day. For instance, external noise from street traffic or other activities may create large amounts of acoustic signals that might be sensed by the leak detectors. In fact, some noise may appear to be a leak when sensed. Therefore, quiet times during the day (or night) can be determined as being adequate times to clearly detect leak activity without excessive interferences. The training module 82 may analyze the acoustic information from the plurality of leak detectors 74 disbursed throughout the system to determine specific wake-up times for each of the leak detectors 74. The leak detectors 74 may then be awakened at their designated times to detect leak activity. The sample request module 84 may be configured to send a signal to the leak detectors 74 at their designated reporting time to awaken them from a sleep mode. Optionally, once the sampling period is known, the leak detectors 74 will awaken automatically at designated times (e.g., the host may not send a wake-up but instead the node analyzes the data and automatically sends results). Upon waking the respective leak detectors 74, the sample request module 84 may then request that the leak detectors 74 detect acoustic signals during the respective 2-hour period and then transmit the results to the host 20. It will be understood by one of skill in the art that the 2-hour period referenced herein is for exemplary purposes only and is not intended to limit the disclosure in any way. Time periods may range from thousandths of a second to many hours, including continuous monitoring, in various embodiments.

The communication module 86 may be configured to communicate with the leak detectors 74 via radio communications, cellular communications, or other suitable types of communication. The timing module 88 may be configured to provide synchronization with the various leak detectors, maintain timing for the processor 80, and maintain time/day information. In this way, the present disclosure supports localizing the leak, which requires time correlated samples from adjacent leak detectors to confirm the present of the leak and to estimate the location of the leak.

The GUIs 90 of the host 20 may be configured to display information regarding leakage information to the user of the host device 20. For example, the GUIs 90 may include color-coded displays to indicate the health status of various mains 54/56 of the water distribution system 50. The GUIs 90 or other similar types of GUIs may also be incorporated with operator system 14 and/or client system 18 shown in FIG. 1.

The leak detector management device 92 may be coordinated with software in the server 12 to share, monitor, and store leakage information from the leak detector nodes within the mesh network. The leak detector management device 92 may receive signals regarding the health status of the actual leak detectors themselves as well as receive acoustic signal information from the leak detectors. The leak detector management device 92 may also be configured to determine the probability of leaks based on the received acoustic information. For example, if the received acoustic information is significantly different from the historic data received by the same leak detector over the past several days, then the leak detector management device 92 may determine with greater probability that a leak has occurred. Optionally, the system may analyze the leak probability from one or more adjacent nodes to determine if the acoustical data is significantly different from a baseline. Otherwise, if the acoustic information is only slightly different from the historic data, a lower probability of a leak can be determined. In this respect, the leak detector management device 92 may provide an indication of the probability of a leak. This indication might be presented as a "high probability," "medium probability," "low probability," or "no probability" of a leak. In other embodiments, the indication of probability may be provided as a percentage. For example, it may be determined that according to received information, the probability of a leak might be 35%.

The database 76 may include a repository for acoustic measurements, such as acoustic waveforms and/or acoustical spectrum data for each of the various leak detector nodes. The database 76 may also store information regarding the configuration of leak detectors 74 within the water distribution system 50 to be able to determine which leak detectors 74 are considered to be adjacent. Therefore, when two adjacent detectors sense similar acoustic activity, the host 20 may be able to determine the general location of a potential leak.

Figure 7:
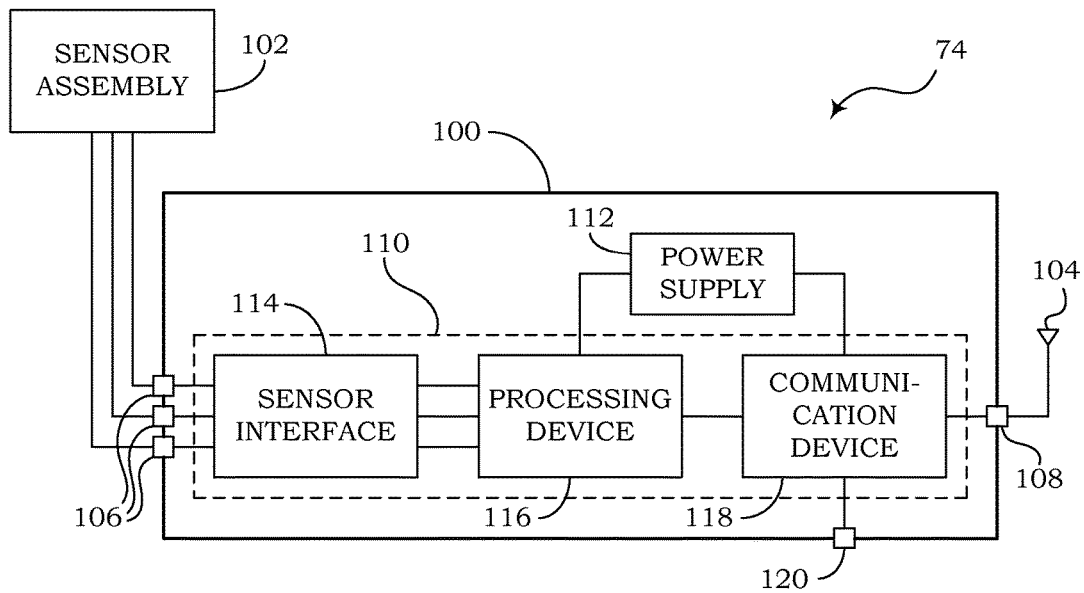
FIG. 7 is block diagram illustrating a leak detector according to various implementations of the present disclosure.

FIG. 7 is a block diagram illustrating an embodiment of the leak detector 74 shown in FIG. 5, according to various implementations. As shown, the leak detector 74 comprises an enclosure 100, a sensor assembly 102, and an antenna 104. The enclosure 100 may include any suitable structure for protecting electrical components mounted inside the enclosure 100 from water and other elements. In some cases, the sensors will be inside the enclosure. According to some implementations, the enclosure 100 may contain a housing that meets IP68 standards. Mounted to the walls of the enclosure 100 are sensor connectors 106 and an antenna connector 108. Electrical components included inside the enclosure 100 and protected by the walls of the enclosure 100 are a carrier assembly 110 and a power supply 112. In some embodiments, the carrier assembly 110 includes a sensor interface 114, a processing device 116 (also referred to as a "logger board"), and a communication device 118. The enclosure 100 also includes a diagnostic port 120 that allows the communication device 118 to have direct contact and communication with another device, such as a portable computer or handheld device, which may be used during installation or maintenance periods. The other device in this respect may be used for monitoring the integrity of the leak detector 74 in the field and for running diagnostic tests on the leak detector 74.

In some embodiments, the carrier assembly 110 is a single printed circuit board with the components of the sensor interface 114, processing device 116, and communication device 118 incorporated on the printed circuit board. In other embodiments, the carrier assembly 110 may include multiple printed circuit boards with the components of the sensor interface 114, processing device 116, and communication device 118 incorporated on the boards in any suitable configuration. When the electrical components are disposed on multiple boards, standoffs may be used as needed. Connectors may be used to couple the processing device 116 with the sensor interface 114 and communication device 118.

The sensor assembly 102 may include any combination of sensors for detecting various parameters that may be analyzed to detect the presence of a leak or burst. For example, the sensor assembly 102 may include one or more piezoelectric sensors, acoustic sensors, acoustic transducers, hydrophones, pressure sensors, pressure transducers, temperature sensors, accelerometers, or other types of sensors. According to some embodiments, the sensor assembly 102 includes five sensors, where four sensors are configured to detect small leaks and the fifth sensor is configured to detect a large leak or burst. The detection of large leaks or bursts may be configured as multiple sensors instead of a single fifth sensor in some embodiments. According to various implementations, the sensor assembly 102 may include three sensors (e.g., an acoustic sensor, a pressure sensor, and a temperature sensor) and may provide the three measurements, respectively, via the sensor connectors 106 to the sensor interface 114.

In yet another embodiment, a primary sensor (such as a hydrophone) may continuously listen for leak detection information while one or more secondary sensors intermittently turn on only at predetermined times, on command, or in response to data detected by the primary sensor. For instance, if the hydrophone detects data indicative of a leak or pipe burst, secondary sensors such as pressure and temperature sensors may activate. The secondary sensor data may be used in conjunction with the primary sensor data to determine location of the leak, severity of the leak, or other information. In other embodiments, the secondary sensors may turn on at predetermined times or on command. For instance, the utility company may wish to monitor the temperature of the water at various intervals such as every few hours or once per day. The temperature sensor may therefore be remotely activated through a network by the utility company, at which point the temperature sensor may determine the temperature and send the data to the utility company via the network. Alternatively, the temperature sensor may be set to automatically and periodically take a measurement, store that measurement, and forward to the host on a pre-determined scheduled. In other embodiments, other configurations of primary sensors and secondary sensors may be implemented, including varying the number and types of primary and secondary sensors. Optionally, the primary and secondary sensor(s) may be integrated into a single sensor or sensor array while in another embodiment the primary and secondary sensor(s) or sensor array(s) may be separate.

The power supply 112 may contain one or more batteries, solar-powered devices, electrical power line couplers, or other power sources. When external power is required, additional connectors or ports may be added through the walls of the enclosure 100. When batteries are used, the power supply 112 may also include a battery voltage detection module for detecting the voltage of the one or more batteries.

The sensor interface 114 acquires the acoustic, pressure, and/or temperature data from the sensor assembly 102. In addition, the sensor interface 114 may include amplification circuitry for amplifying the sensed signals or the sensor assembly 102 may include an amplification circuitry to eliminate effects of interconnecting cable. The sensor interface 114 may also include summing devices, low pass filters, high pass filters, and other circuitry for preparing and/or manipulating the signals for the processing device 116.

Figure 8:
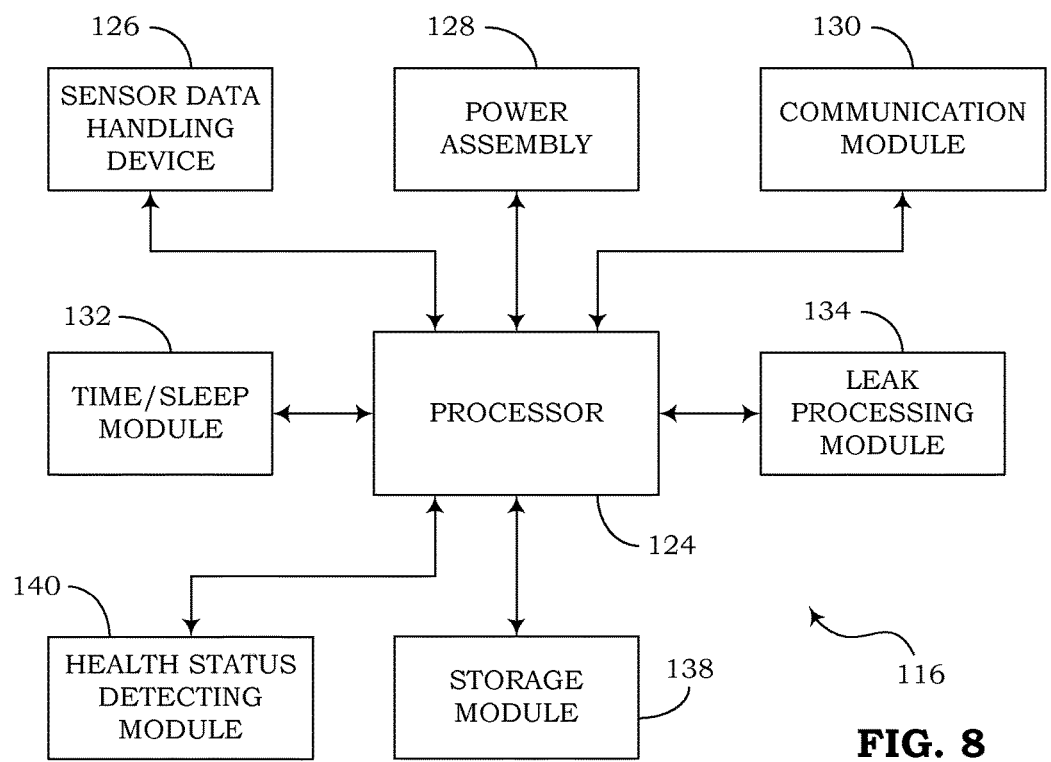
FIG. 8 is a block diagram illustrating the processing device shown in FIG. 7 according to various implementations of the present disclosure.

The processing device 116, as described in more detail below with respect to FIG. 8, is configured to process the sensed signals, determine whether a leak exists or the probability that a leak exists. The processing device 116 is also configured to log the acoustic information and save it until a designated time when the host 20 requests the data.

The communication device 118 may include a modem, such as a cellular or ISM-enabled modem to provide network access to the communication device 118. Also, the communication device 118 may include a timing module, such as a GPS timing receiver, or timing might be provided over the mesh network, for providing an accurate timing reference for the leak detector 74 and for synchronizing timing signals with other elements of the leak detection system 10. The communication device 118 may be configured to transmit and receive RF signals (e.g., ISM frequency signals), cellular signals, GPS signals, etc., via the antenna 104. In addition, the communication device 118 may send and receive diagnostic testing signals with an external device (e.g., handheld device) via the diagnostic port 120.

FIG. 8 is a block diagram showing an embodiment of the processing device 116 shown in FIG. 7. The processing device 116, which may also be referred to as a "logger" device, is configured to detect the presence of a leak in a pipe. As illustrated, the embodiment of the processing device 116 includes a processor 124, a sensor data handling device 126, a power assembly 128, a communication module 130, a time/sleep module 132, a leak processing module 134, a health status detecting module 140, and a storage module 138. The processor 124 may comprise one or more of a microcontroller unit (MCU), a digital signal processor (DSP), and other processing elements.

The sensor data handling device 126 connects with the sensor interface 114 and handles the sensor data to allow processing of the signals by the processor 124. The power assembly 128 may comprise a power source, which may be separate from the power supply 112. In some embodiments, however, the power assembly 128 may be connected to the power supply 112. The power assembly 128 may also be configured to control the voltage and current levels to provide constant power to the processor 124. In some embodiments, the processor 124 may be provided with about 3.0 volts DC. The communication module 130 connects with the communication device 118 and receives and/or sends signals for communication through the communication device 118.

In some embodiments, the communication device 118 may include a GPS device for receiving timing samples for synchronization purposes. Time samples (or time stamping) is useful for synchronizing two or more devices (such as leak detectors) to assist in correlating the signals of each device. In one embodiment, time stamps may be accurate to less than 10 ms, although other degrees of accuracy may be applicable depending on the particular deployment. Once the leak detectors collect data and time stamp them, the timing samples may be forwarded to the communication module 130 to allow the processing device 116 to be synchronized with other devices. For instance, referring to FIG. 5, leak detectors 74 may collect data associated with leak 72 in pipe 74. The data will be time stamped and transmitted through network 22 to host 20 and stored in database 76. In this way, data collected from two or more leak detectors may be synchronized and correlated in order to isolate the specific location of a leak or break in a pipe. In one embodiment, the communication device 118 may receive precise timing information over the mesh network from a server, GPS satellite, etc., and may input the precise timing information via the communication module. The precise timing information enables the leak detectors and/or other nodes within the network to synchronize their data and communications. In another embodiment, the communication device 118 may be equipped to communicate directly with a server, GPS satellite, etc., without transmitting data through the mesh network.

The timing samples may also be used to wake up the processing device 116 when needed or cause the processor to sleep when inactive. Alternatively, the processing device 116 may wake up at predetermined or scheduled intervals. In one embodiment, two leak detectors may be in a sleep mode. A "wake up" signal may be sent remotely through a network (such as network 22) to the leak detectors commanding the leak detectors to wake up and "listen" for a leak. When the two leak detectors wake up, they may first synchronize with one another by exchanging time stamping information to ensure that the two leak detectors perform their respective leak detection at the same time. This allows the location of a leak to be determined. The leak detection information may then be transmitted through the network to a host and database for correlation and analysis.

The processing device 116 also includes a time/sleep module 132 for providing timing signals to the processor 124 and may include a crystal oscillator. The time/sleep module 132 also controls sleep modes in order to minimize battery usage when the leak detector 74 is not in use. For example, the processor 124 may include an MCU that operates continually and a DSP that sleeps when not in use. In one embodiment, the processing device 116 sleeps most of the time and awakes periodically to detect a signal on one of its sensors. Since the DSP normally uses more power, it is allowed to sleep whenever possible in order to conserve battery power.

The time/sleep module 132 may be configured to wake various components of the processor 124 at designated times to transmit sensor data stored during a previous time to the host 20. In some embodiments, the time/sleep module 132 may wake the leak detector 74 at a certain time during the day, enable the sensor assembly 102 to analyze and record an acoustic waveform for approximately ten seconds, return to a sleep mode for about ten minutes, and repeat the wake/analysis/sleep cycle every ten minutes or so for about two hours. The time/sleep module 132 may be further configured, in one embodiment, to cause the processor 124 to wake upon receipt of a remote signal requesting the leak detector 74 to perform leak processing on demand. After these waveforms are sensed, the leak detector 74 sends the data to the host 20 and the time/sleep module 132 returns the device to a sleep mode until the designated time on the next day. Separate from the regular sensing schedule, the time/sleep module 132 may be configured to wake up the processor 124 in the event that a large leak, or burst, has been detected.

The leak processing module 134 may be configured to perform the analysis of the acoustic waveforms and other sensed parameters to determine if a leak has been sensed. The leak processing module 134 can also determine the probability or likelihood that the sensed data is indicative of a leak. The leak processing module 134 may also be configured to constantly monitor for a burst, in which case an alarm will be sent. In addition to sensing small leaks and bursts, the leak processing module 134 may also be configured to detect unauthorized tampering with a fire hydrant 58 associated with the leak detector 74. Regarding tamper sensing, the leak processing module 134 may be configured to determine if a person is tampering with a pumper nozzle of the hydrant 58, if there is an unauthorized flow of water from the hydrant 58, or if the hydrant 58 has been damaged, such as from impact by a vehicle. In some respects, detecting for tampering may use similar methodology as is used for sensing bursts, in that the acoustic waveform may display a quick and pronounced plateau above the normal baseline waveform.

At times, the health status detecting module 140 may be configured to operate to determine the health or integrity of the leak detector 74 using various diagnostic tests. For example, the status may be detected every time the leak detector 74 wakes up from a sleep mode, which may be repeated several times throughout a two-hour sensing stage. The health status detecting module 140 may detect the sensor functionality and the functionality of other hardware devices to determine if there are any issues. The health status detecting module 140 can also monitor an MCU and/or DSP of the processor 124, memory of the storage module 138, etc. When issues are discovered during the diagnostic tests, the health status detecting module 140 may set flags to indicate the status of the various components of the leak detector 74. These flags may be communicated to the host 20 at designated times or on demand.

The storage module 138 may include flash memory, read-only memory (ROM), random access memory (RAM), or other types of memory. The storage module 138 may comprise a database for storing acoustic waveforms. The database may include frequency bins for storing current acoustic data as well as historic data collected over several days. The processor 124 is configured to utilize the stored waveforms to detect the presence or probability of leaks, bursts, or tampering activity.

According to various implementations of the present disclosure, the leak processing module 134 may be configured to process acoustic signals related to large-diameter pipes (e.g., transmission mains) in the water distribution system 50. The leak detection in these implementations includes monitoring acoustic activity of the water main. As such, water mains are acoustic systems that respond to various excitations by vibrating at their resonant frequencies. For a large pipe, the resonant frequency is typically very low and may contain a fairly precise or predictable natural frequency. Since acoustic signals will attenuate as a function of frequency, where attenuation occurs per frequency cycle, low frequency waves (which have longer wavelengths) will tend to travel much farther than higher frequency waves (which have shorter wavelengths). Thus, the farther an acoustic wave travels along the water main, the more the water main attenuates the lower frequencies.

Sensing the acoustic or vibration response of a large pipe may include the use of a hydrophone, a pressure sensor, piezoelectric sensor, an accelerometer, or other types or combinations of acoustic measuring instruments. Hydrophones may be used in particular to measure a change in pressure or vibration. Pressure sensors, on the other hand, may be used in particular to measure an absolute pressure value. Also, pressure sensors may be used as a burst sensor (e.g., as disclosed in the present disclosure) or used along with the burst sensor. In this respect, the sensor may measure a high-speed pressure transient profile. Both the pressure change value and absolute pressure value may be useful for different applications. In some embodiments, a hydrophone may operate continually and measure a transient, which may be indicative of a burst from a leak or a noise signal, and then awaken other sensors as needed. The sensor(s) may measure voltage signals that represent vibration strength over time or other frequency measurements. Temperature sensors may also be used for measuring the temperature of the water within the pipe. This information may be useful, not to measure a leak, but to determine the temperature at which a pipe breaks, if this information is desired for pipe integrity analysis. The sensed waveform signals are supplied to the processing device 116, which may process the signals at the point of measurement. In other embodiments, the signals may be transmitted to the host 20 for processing.

Although the descriptions herein disclose processes by the leak processing module 134 for detecting leaks in large pipes, it should be noted that the leak processing module 134 may be configured as software or firmware and the functions performed by the processor 124. The processor 124, as mentioned above, may include a DSP, microcontroller, or other types of processing units. In some embodiments, the signals may be communicated to the host 20, as shown in FIG. 6, such as using radio-frequency, where processing may occur. It is advantageous that the various processing devices automatically clean the waveform signals in order to remove unwanted noise. The real time processing may be performed by a DSP, for example. Then, when most traces of noise are removed, the processing devices can determine the presence of a leak and its characteristics (e.g., size, volume, etc.), if one is present.

The frequency range of interest for large pipes may include signals in the frequency band from zero to about 2500 Hz. A leak is detected as a low frequency wave, but it shares the same frequency range as other noises that interfere with the leak signal. For example, a subway train traveling down a track or a truck driving over a manhole cover provides an acoustic waveform in the same frequency range as a leak. The leak processing module 134 is configured, according to these embodiments, to filter or remove the portions of the waveforms that are not related to a leak. A leak typically has a constant waveform at a constant frequency. A noise event is typically detected as a transient, which may appear as a blip or sharp point on the waveform.

In one embodiment of the present disclosure, the leak processing module 134 receives multiple acoustic signals from the sensor data handling device 126 to listen for leaks. Upon a determination that a leak condition may be present, the leak processing module 134 may convert the received acoustic signals from the time domain to the frequency domain (e.g., using fast Fourier transforms), according to some embodiments. The leak processing module 134 calculates a threshold level related to a normal baseline waveform. When the leak processing module 134 detects a transient in one of the received acoustic signals that exceeds the threshold level, a portion of each of the acoustic signals' waveforms is spliced. For example, splicing, which occurs in the time domain, the portion of the waveform may be similar to cutting out a short length of ribbon from a middle section along it entire length and then reattaching the two loose ends. However, when a waveform is reattached, oftentimes a discontinuity may occur where the points are rejoined. If this is the case, the leak processing module 134 is configured to perform a wave smoothing operation, which gradually smoothens out the waveform to a more natural look without any discontinuity.

Figure 9A:
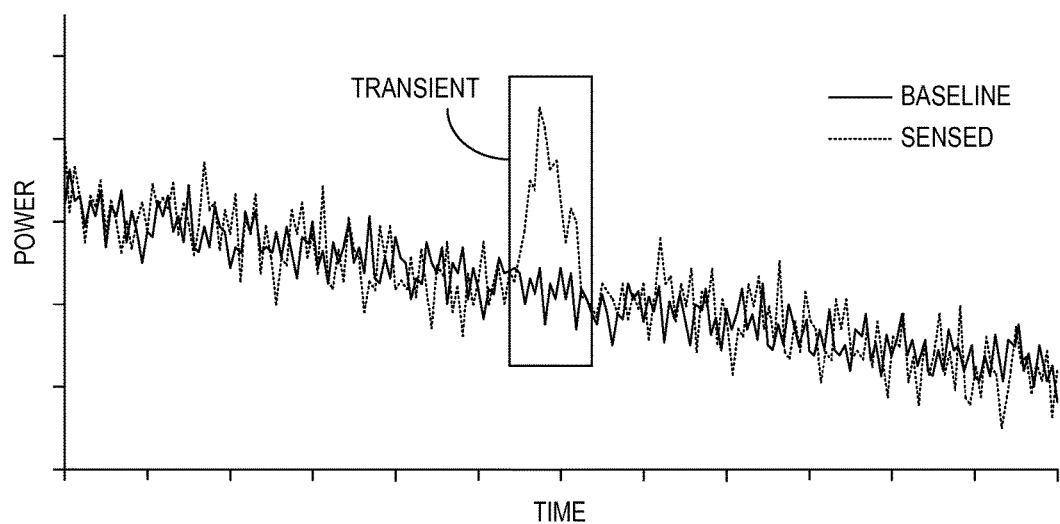

FIGS. 9A-E are graphs illustrating a waveform smoothing operation according to the embodiments described above with respect to the detection of leaks in large-diameter water mains. FIG. 9A shows a sample of exemplary acoustic data received by the processing device 116. According to this example, the acoustic data includes a waveform having a transient caused by noise unrelated to a leak. The leak processing module 134 detects the transient based on a comparison with threshold levels. For example, the threshold levels may be calculated as a percentage of the amplitude of the signal's power above and below a normal waveform. When the detected signals exceed the threshold levels, the leak processing module 134 is configured to process the signals to determine if a leak is present or if the signals are indicative of a transient caused by noise from traffic or other external sources.

Figure 9B:
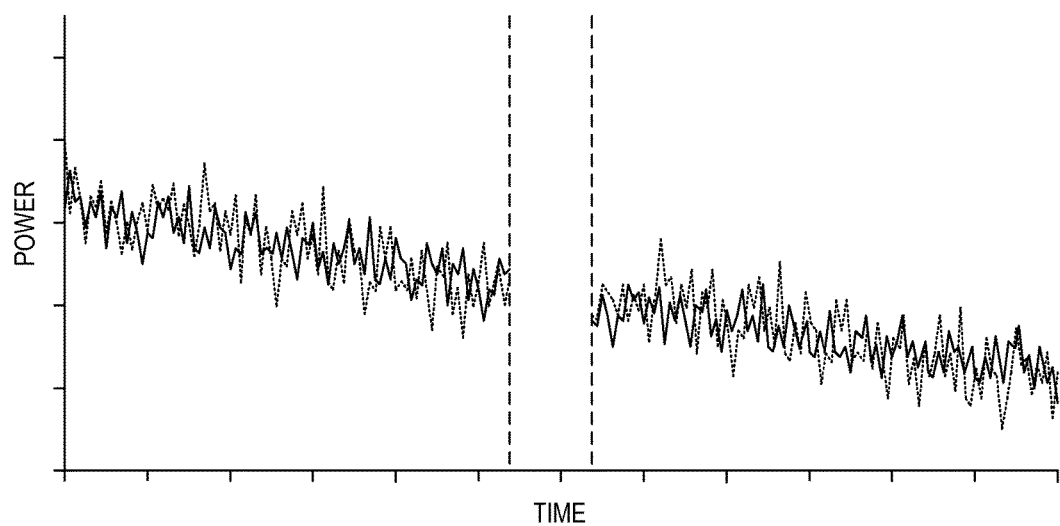

When it is determined that a transient in the waveform is caused by a source unrelated to a leak, the leak processing module 134 is configured to remove the transient from the waveform. The graph of FIG. 9B shows a process wherein the leak processing module 134 completely removes the data in the section of the waveform, which leaves a gap in the waveform. As shown in FIG. 9C, the gap is closed by rejoining the loose ends of the waveform back together at the dashed line. When multiple sensor data, are used to form multiple parallel waveforms, the same time section of each waveform is extracted and rejoined in order that keep the same sections of time for all waveforms.

After the loose ends of the waveform are reattached, the leak processing module 134 determines if a discontinuity is created by the splicing of the sections of waveform together with the middle part removed. FIG. 9D shows a magnified view of a waveform where it has been reattached. In this case, a discontinuity may be detected. In this case, a wave smoothing operation may be performed, as shown in FIG. 9E, where the points of the waveform are automatically manipulated by the leak processing module 134 to provide a continuous waveform. Some points before the splice and after the splice can be manipulated to smooth out the waveform.

Figure 10:
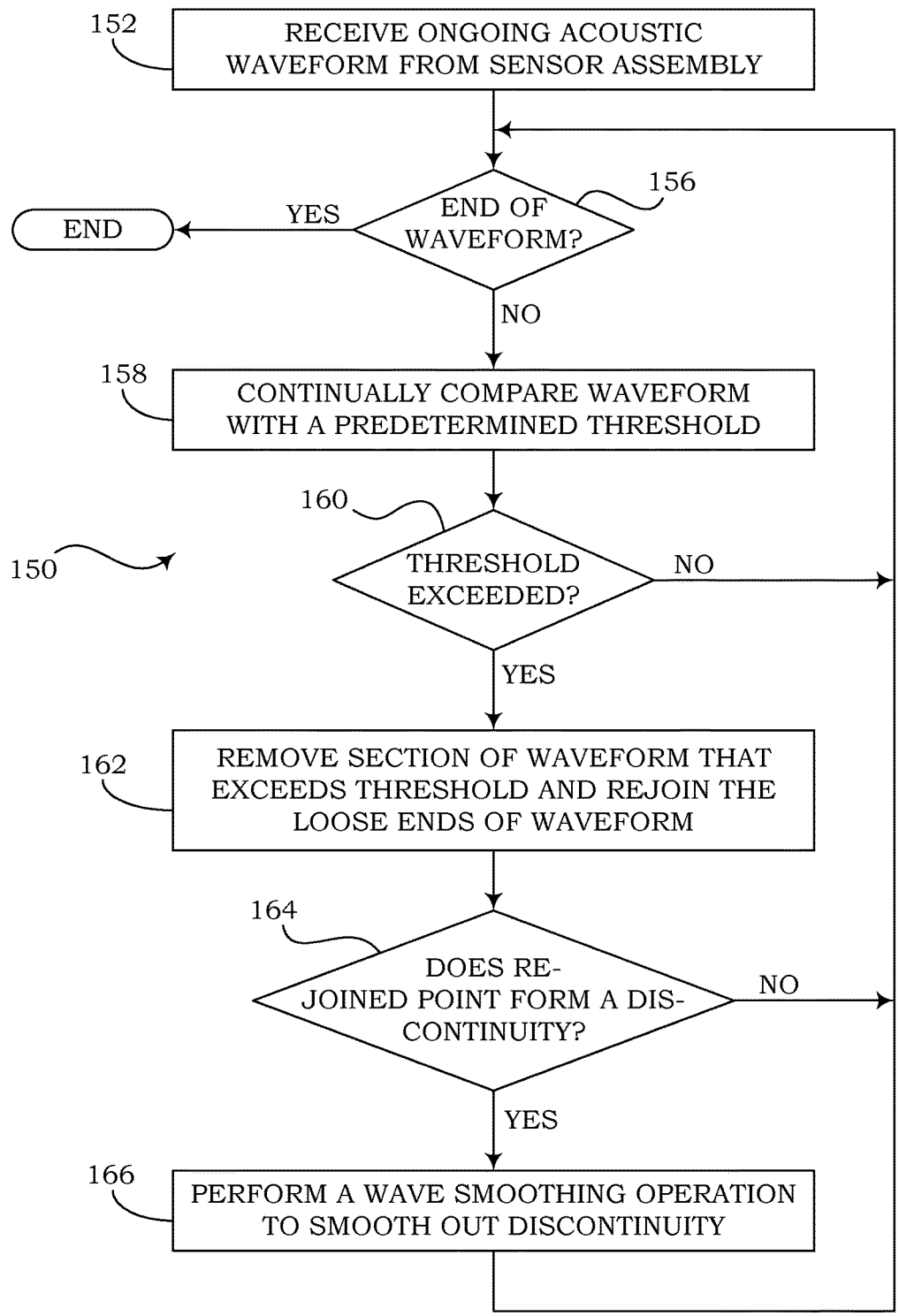
FIG. 10 is a flow diagram illustrating a method for processing acoustic signals according to various implementations of the present disclosure.

FIG. 10 is a flow diagram illustrating an embodiment of a method 150 for processing acoustic signals. In this embodiment, the method 150 includes the step of receiving a continuous acoustic waveform from the sensor assembly, as indicated in block 152. The sensor assembly may include the sensor assembly 102 shown in FIG. 7, or in some embodiments, may include a single sensor, such as a hydrophone. According to some embodiments, the sensor assembly may include a hydrophone, pressure sensor, and a temperature sensor integrated into one sensor or combined in separate sensors. The hydrophone or other sensors may operate continually to provide the ongoing acoustic waveform.

According to decision block 156, it is determined whether an end of the waveform is detected, such as if the sensor is turned off or put in a sleep state. If so, the method ends. If the waveform continues, the method proceeds to block 158. As indicated in block 158, the method includes continually comparing the waveform with a predetermined threshold. The predetermined threshold can be determined immediately before the comparing step is performed. The comparison may comprise determining how much the waveform differs from a normal waveform without the presence of external noises and leaks by a certain amount or by a certain percentage. As indicated in decision block 160, it is determined whether or not the threshold has been exceeded. If not, then the waveform does not require further processing at the particular section in the waveform and loops back to decision block 156. However, if it is determined that the waveform does exceed the threshold, the method proceeds to block 162 for further processing.

As indicated in block 162, the method includes removing a section of the waveform that exceeds the threshold and then rejoining the loose ends of the waveform back together. This may be similar to cutting a short length of ribbon from a middle section of the ribbon and then re-attaching or splicing the loose ends of the ribbon together. Once reattached, the method proceeds to decision block 164, which indicates that it is determined whether or not the rejoined point forms a discontinuity in the waveform. For example, it may be unlikely that the reattached waveform is joined where the points match. Therefore, a discontinuity may be a jump from one point to another with little transition time, which itself may cause problems in the processing of such a resulting waveform since such a jump might be interpreted as another transient or a leak. If there is not discontinuity determined in decision block 164, the method returns back to decision block 156. Otherwise, if there is a discontinuity, the method proceeds to block 166. As indicated in block 166, the method includes performing a wave smoothing operation to smooth out the discontinuity. The wave smoothing operation may include manipulating points of the waveform so as to eliminate the discontinuity. Thus, the waveform may be presented so as not to disrupt any further processing. After wave smoothing for this section of the waveform, the method returns to decision block 156 to continue analyzing more sections of the waveform, if there are more sections to analyze.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A processor-implemented method comprising the steps of:
   receiving, at a processor, current leak detection information comprising an acoustic waveform in a time domain from a first sensor in a fluid distribution system;
   calculating, by the processor, threshold levels from a normal baseline waveform, the normal baseline waveform determined from historical acoustic data received from the first sensor;
   detecting, by the processor, a transient in a portion of the acoustic waveform by determining that an amplitude of the acoustic waveform exceeds the threshold levels;
   upon detecting the transient, completely removing all of the data in the portion of the acoustic waveform from the current leak detection information leaving a gap in the acoustic waveform with a first end and a second end; and
   splicing, by the processor, the first and the second end of the gap in the waveform together,
   wherein the current leak detection information with the transient removed is utilized by the processor to determine a probability of a leak in the fluid distribution system based on a correlation between the current leak detection information and the normal baseline waveform.

2. The method of claim 1, wherein the current leak detection information comprises time stamp information.

3. The method of claim 1, wherein the current leak detection information is received from a first node in a mesh network communicatively connected to the processor through one or more intermediate nodes.

4. The method of claim 1, wherein the first sensor comprises one from the group consisting of a piezoelectric sensor, an acoustic transducer, a hydrophone, a pressure sensor, and an accelerometer.

5. The method of claim 1, further comprising the step of providing an alarm to an operator system based on the probability of the leak.

6. The method of claim 1, further comprising the step of:
   detecting, by the processor, a discontinuity in the acoustic waveform at a position of the removed portion of the acoustic waveform; and
   upon detecting the discontinuity, performing, by the processor, a wave smoothing operation of the acoustic waveform to smooth the discontinuity in the acoustic waveform.

7. The method of claim 1, wherein the threshold levels comprise a percentage of an amplitude of the normal baseline waveform.

8. A system for detecting a leak in a fluid distribution system, the system comprising:
   a plurality of leak detectors in the fluid distribution system, each leak detector comprising one or more sensors, a processing device, and a communication device, the processing device configured to
     receive signal data from the one or more sensors,
     process the signal data, and
     send the processed signal data via the communication device to a host, the processed signal data comprising an acoustic waveform in a time domain; and the host comprising a processor, a database, and a communication module, the processor configured to
receive via the communication module a plurality of processed signal data from the plurality of leak detectors,
calculate threshold levels from a normal baseline waveform, the normal baseline waveform determined from historical acoustic data received from the plurality of leak detectors,
detect a transient in a portion of an acoustic waveform from a first leak detector of the plurality of leak detectors by determining an amplitude of the acoustic waveform exceeds the threshold levels, wherein the portion of the acoustic waveform from the first leak detector is a specific time section,
upon detecting the transient in the portion of the acoustic waveform, completely remove all of the data in the portion of the acoustic waveform for the specific time section from the processed signal data for each leak detector from the plurality of leak detectors leaving a gap in the acoustic waveform with a first end and a second end,
splice the first and the second end of the gap in the acoustic waveform together, and
determine from the processed signal data with the transient removed that a leak has occurred in the fluid distribution system based on a correlation between the processed signal data and the normal baseline waveform.

9. The system of claim 8, wherein the processing device is configured to send the processed signal data to the host on a periodic basis.

10. The system of claim 8, wherein the processing device is configured to send the processed signal data to the host in response to receiving a request from the host.

11. The system of claim 8, wherein the processing device is configured to, upon receiving signal data from a first sensor of the one or more sensors indicative of a leak in the fluid distribution system, activate a second sensor of the one or more sensors to collect additional signal data to be sent to the host.

12. The system of claim 11, wherein the second sensor is configured to collect data regarding one or more of a size of the leak and a location of the leak.

13. The system of claim 8, wherein the leak detector comprises an acoustic sensor, a pressure sensor, and a temperature sensor, wherein each of the sensors may be activated by the processing device independently.

14. The system of claim 8, wherein processing the signal data comprises time stamping the signal data.

15. The system of claim 14, where the processing device is further configured to exchange timing information with other of the plurality of leak detectors to synchronize time stamping of signal data between the plurality of leak detectors.

16. The system of claim 8, wherein the processor is further configured to:
detect a discontinuity in the acoustic waveform at a position of the removed portion of the acoustic waveform; and
upon detecting the discontinuity, perform a wave smoothing operation of the acoustic waveform to smooth the discontinuity in the acoustic waveform.

17. An apparatus comprising:
one or more sensors;
a communication device; and
a processing device operatively coupled to the one or more sensors and the communication device and configured to
receive an acoustic waveform in a time domain from the one or more sensors,
determine whether an amplitude of the acoustic waveform exceeds a predetermined threshold, the predetermined threshold calculated from a normal baseline waveform determined from historical acoustic data received from the one or more sensors,
upon determining that the predetermined threshold has been exceeded, completely remove all of the data in a section of the acoustic waveform where the amplitude exceeds the predetermined threshold leaving a gap in the acoustic waveform with a first end and a second end,
splice the first and the second end of the gap in the acoustic waveform together, and
upon splicing the acoustic waveform together, transmit data regarding the acoustic waveform without the removed section to a host via the communication device, the host configured to detect a leak in a fluid distribution system based on a correlation between the acoustic waveform and the normal baseline waveform.

18. The apparatus of claim 17, wherein the processing device is further configured to:
detect a discontinuity in the acoustic waveform at a position of the removed section of the acoustic waveform; and
upon detecting the discontinuity, perform a wave smoothing operation of the acoustic waveform over the removed section to smooth the discontinuity in the acoustic waveform.

19. The apparatus of claim 17, wherein the apparatus is coupled to a distribution main of the fluid distribution system.

20. The apparatus of claim 17, wherein the fluid distribution system comprises a water distribution system and the apparatus is coupled to a hydrant of the water distribution system.

* * * * *